United States Patent
Berger et al.

(10) Patent No.: US 11,565,402 B2
(45) Date of Patent: Jan. 31, 2023

(54) SUBSTRATE TRANSFER DEVICES, SYSTEMS AND METHODS OF USE THEREOF

(71) Applicant: APPLIED MATERIALS, INC., Santa Clara, CA (US)

(72) Inventors: Alexander Berger, Palo Alto, CA (US); Jeffrey C Hudgens, San Francisco, CA (US)

(73) Assignee: Applied Materials, Inc., Santa Clara, CA (US)

( * ) Notice: Subject to any disclaimer, the term of this patent is extended or adjusted under 35 U.S.C. 154(b) by 435 days.

(21) Appl. No.: 16/813,191

(22) Filed: Mar. 9, 2020

(65) Prior Publication Data

US 2021/0276179 A1    Sep. 9, 2021

(51) Int. Cl.
| | |
|---|---|
| *B25J 9/04* | (2006.01) |
| *B25J 9/12* | (2006.01) |
| *B25J 11/00* | (2006.01) |
| *B25J 9/00* | (2006.01) |
| *B25J 9/10* | (2006.01) |

(52) U.S. Cl.
CPC ............. *B25J 9/042* (2013.01); *B25J 9/0009* (2013.01); *B25J 9/104* (2013.01); *B25J 9/123* (2013.01); *B25J 11/0095* (2013.01)

(58) Field of Classification Search
CPC . B25J 9/0009; B25J 9/023; B25J 9/042; B25J 9/104; B25J 9/123; B25J 11/0095; H01L 21/67706; H01L 21/68
See application file for complete search history.

(56) References Cited

U.S. PATENT DOCUMENTS

| | | | |
|---|---|---|---|
| 3,939,514 A * | 2/1976 | Cook ................ | H01L 21/67706 451/261 |
| 4,217,977 A * | 8/1980 | Tam .................. | H01L 21/67736 198/346.2 |

(Continued)

FOREIGN PATENT DOCUMENTS

| | | |
|---|---|---|
| CN | 102110633 | 6/2011 |
| EP | 2 258 521 | 8/2015 |
| JP | H0812077 | 1/1996 |

*Primary Examiner* — Joseph Brown
(74) *Attorney, Agent, or Firm* — Lowenstein Sandler LLP

(57) ABSTRACT

The disclosure describes devices, systems and methods relating to a transfer chamber for an electronic device processing system. For example, a robot can include a first mover configured to be driven by a platform of a linear motor, a support structure disposed on the first mover, a first robot arm attached to the first end of the support structure at a shoulder axis, and a first arm drive assembly. The first drive assembly can include a first pulley attached to a first end of the support structure and to the first robot arm at the shoulder axis, a second pulley attached to a second end of the support structure, a first band connecting the first pulley to the second pulley, and a second mover configured to be driven by the platform of the linear motor, where the second mover is connected to the first band, and where motion of the second mover relative to the first mover causes the first band to a) rotate the first pulley and the second pulley and b) rotate the first robot arm around the shoulder axis. Also disclosed are systems and methods incorporating the robot.

16 Claims, 8 Drawing Sheets

(56) References Cited

U.S. PATENT DOCUMENTS

| | | | |
|---|---|---|---|
| 4,534,697 A * | 8/1985 | Poncet | B25J 9/104 |
| | | | 74/110 |
| 4,674,238 A * | 6/1987 | Suzuki | B23Q 7/00 |
| | | | 451/337 |
| 4,874,998 A | 10/1989 | Hollis, Jr. | |
| 4,897,015 A * | 1/1990 | Abbe | B25J 9/106 |
| | | | 901/17 |
| 5,221,175 A * | 6/1993 | Schnyder | H01L 21/68 |
| | | | 198/463.1 |
| 5,720,010 A | 2/1998 | Watanabe et al. | |
| 7,988,398 B2 | 8/2011 | Hofmeister et al. | |
| 8,283,813 B2 | 10/2012 | Gilchrist et al. | |
| 8,807,905 B2 | 8/2014 | Meulen | |
| 9,524,896 B2 | 12/2016 | Bluck et al. | |
| 9,691,649 B2 | 6/2017 | Hoey et al. | |
| 9,799,544 B2 | 10/2017 | Wirth | |
| 9,862,554 B2 | 1/2018 | Caveney | |
| 10,056,279 B2 | 8/2018 | Janakiraman et al. | |
| 10,363,665 B2 | 7/2019 | Hosek et al. | |
| 2013/0230370 A1 | 9/2013 | Hoey et al. | |
| 2017/0117171 A1* | 4/2017 | Wirth | B25J 9/1045 |
| 2021/0170587 A1* | 6/2021 | Tanishima | B25J 9/1612 |

* cited by examiner

SUBSTRATE TRANSFER DEVICES, SYSTEMS AND METHODS OF USE THEREOF

FIELD

The disclosure relates generally to the field of robotics and substrate transfer systems that transport substrates between chambers within an isolated environment. More particularly, disclosed are various embodiments of a robot driven by magnetic levitation within a transfer chamber, wherein the robot can transfer substrates between the transfer chamber and a plurality of process chambers connected thereto. Also disclosed are systems and methods including the various embodiments of the robot.

BACKGROUND

Semiconductor devices are produced on semiconductor substrates using numerous process steps within several process chambers. Each process chamber is used to complete one or more of the various steps (e.g., etching, polishing, depositions) to form the semiconductor devices. Substrate transfer systems are used to move the substrates between each of the process chambers. The process chambers and the substrate transfer system can each be held under vacuum. A common arrangement used for substrate transfer systems is a linear arrangement where process chambers are arranged in rows along each side of a linear (rectangular) chamber.

A substrate transfer system using a linear arrangement typically includes a robot. The robot is configured to run linearly back and forth along the linear chamber. Conventional robots for linear chambers are rail mounted and/or use electrical motors that are powered by an electric cable. These electrically powered components generate heat and the movement of the robots along the hard rails as well as the movement of electric cables along the chamber can generate particulate contaminants. When the linear chamber is evacuated, for example, when transferring a substrate from a load lock to a transfer chamber using the robot, the particulates may form a dust some of which may land on the substrate. Such contamination results in costly defects on the substrate.

BRIEF SUMMARY

According to various embodiments, disclosed herein is a robot, comprising a first mover configured to be driven along a platform of a linear motor; a support structure disposed on the first mover; a first robot arm attached to the first end of the support structure at a shoulder axis; and a first arm drive assembly. The first arm drive assembly comprises a first pulley attached to a first end of the support structure and to the first robot arm at the shoulder axis; a second pulley attached to a second end of the support structure; a first band connecting the first pulley to the second pulley; and a second mover configured to be driven along the platform of the linear motor, wherein the second mover is connected to the first band, and wherein motion of the second mover relative to the first mover causes the first band to a) rotate the first pulley and the second pulley and b) rotate the first robot arm around the shoulder axis.

In further embodiments, disclosed herein is a robot, comprising: a first mover configured to be driven along a platform of a linear motor; a support structure disposed on the first mover; a first robot arm positioned above the first mover and on the support structure at a shoulder axis; and a first arm drive assembly. The first arm drive assembly comprises a first pulley disposed at a first end of the support structure and attached to the first robot arm at the should axis; a second pulley disposed at a second end of the support structure; a first band connecting the first pulley to the second pulley; a second mover configured to be driven along the platform of the linear motor; and a first vertical shaft coupled to the second mover, wherein the second pulley is connected to the first vertical shaft, and wherein rotation of the second mover causes a) the second pulley to rotate the first band and b) the first band to rotate the first pulley and the first robot arm about the shoulder axis.

According to various embodiments, further disclosed herein is an electronic device processing system, comprising: a transfer chamber comprising a magnetic levitation platform; and a robot disposed in the transfer chamber above the magnetic levitation platform, the robot comprising: a first mover configured to be driven by the magnetic levitation platform; a support structure disposed on the first mover; a first robot arm attached to a first end of the support structure at a shoulder axis; and a first arm drive assembly. The first arm drive assembly comprises a first pulley attached to the first end of the support structure and to the first robot arm at the shoulder axis; a second pulley attached to a second end of the support structure; a first band connecting the first pulley to the second pulley; and a second mover configured to be driven by the magnetic levitation platform, wherein the second mover is connected to the first band, and wherein motion of the second mover relative to the first mover causes the first band to a) rotate the first pulley and the second pulley and b) rotate the first robot arm around the shoulder axis.

In further embodiments, disclosed herein is a method of transferring substrates between a transfer chamber and a plurality of process chambers, wherein the transfer chamber comprises a magnetic levitation platform, the method comprising: causing, by a magnetic levitation platform, a robot arm of a robot arm assembly comprising the robot arm and a plurality of movers to pick up a first substrate, by causing, by the platform, a first mover of the plurality of movers to rotate or to change a first distance to a second mover of the plurality of movers, wherein rotation of the first mover or the change in the first distance between the first mover and the second mover causes the robot arm to rotate about a shoulder axis; and causing, by the platform, one of a) the second mover to rotate or b) a third mover to change a second distance to the second mover, wherein rotation of the second mover or the change in the second distance between the third mover and the second mover causes the robot arm to raise or lower.

BRIEF DESCRIPTION OF THE DRAWINGS

The present disclosure is illustrated by way of example, and not by way of limitation, in the figures of the accompanying drawings in which like references indicate similar elements.

DETAILED DESCRIPTION

Figure 1A:
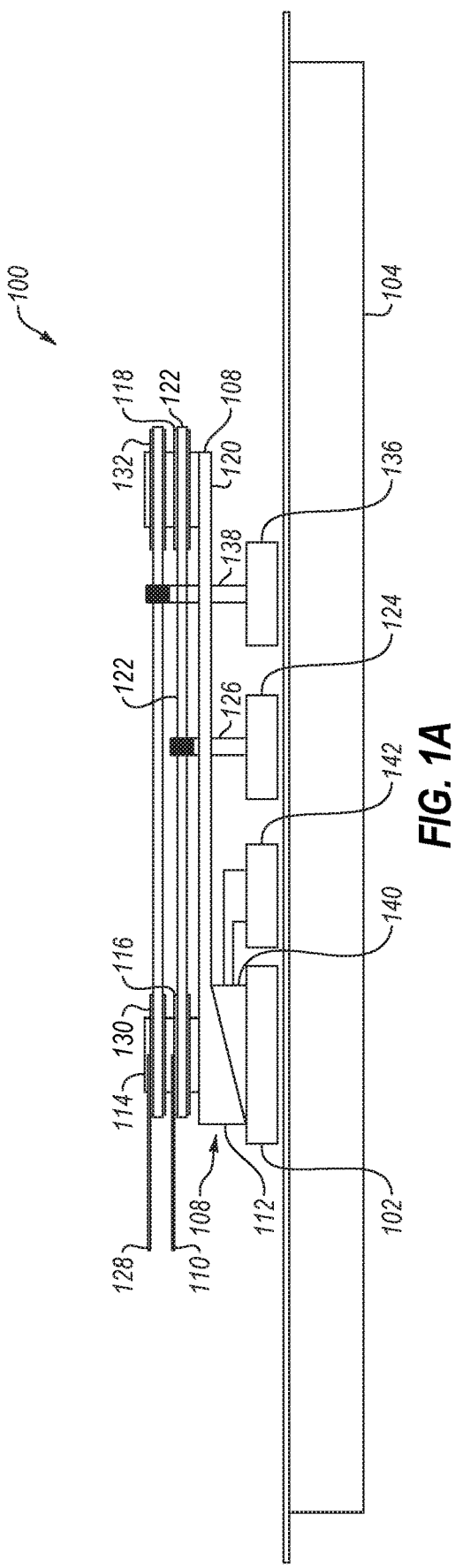
FIG. 1A is a schematic showing a side view of a robot according to embodiments described herein.

Described herein are embodiments of a non-friction linear robot for vacuum and atmospheric chamber applications. The architecture of the robot includes a robot arm with one or more segments that are movable about one or more axes, but without any electrical power being provided to the robot arm (e.g. to the axes). Embodiments of the robot include a plurality of linear magnetic levitation movers (also referred to simply as movers) the relative position of which define a position of the robot arm and/or a rotational angle of each of the axes. The robot, according to various embodiments, enables the use of long linear motors in a vacuum (or atmospheric) chamber without the need of a long electrical cable running to the robot arm or to the motor axes. Eliminating the delivery of power to the in-vacuum components also eliminates cooling components within the vacuum chamber because all of the power components may be positioned on an atmospheric side of the transfer chamber. The various embodiments of the robots and related systems and methods described herein limit particle generation since there is no friction between a moving robot and a main frame and fewer or no mechanical bearings in the transfer chamber. The low particle generation also is a result of lowering or eliminating outgassing from grease, which is required for the bearings, and from electrical cables and connectors, which are unnecessary for a magnetic levitation drive. As such, robots and related systems according to embodiments herein have low maintenance and a longer life because of little or no grease to replace, and fewer frictional and mechanical elements that can reduce reliability.

According to embodiments, a robot as described herein, operates one or more robot arms independently and provides a common vertical movement to the one or more robot arms. It can include a plurality of linear movers, a first (main) mover, and one or more additional movers. One of the additional movers can actuate vertical movement using a wedge platform (or other means) mounted on the top of the first (main) mover. As will be described in more detail below, changing the horizontal distance between the mover for providing vertical movement (i.e., the vertical mover) and the first (main) mover can raise or lower the robot arm. The robot can further include a support structure (e.g., a cantilevered beam) having one or more pulleys (e.g., including bearings) on both ends of the support structure. Sets of the one or more pulleys are linked with bands (e.g., metal or made of another material). A robot arm can be attached to the one or more pulleys positioned above the first (main) mover. At least one of the one or more additional movers may be attached to a respective band via a small post. The one or more additional movers move the bands by changing their horizontal distance to the first (main) mover, which correspondingly rotates a robotic arm attached thereto.

According to further embodiments, a robot, as will be described in more detail below, can be configured to independently move two arms and to provide a common vertical motion for the two or more arms. The robot can accomplish moving the two arms and providing vertical motion by using three (3) movers, for example. The movers can rotate the arms independently and move linearly together. A support structure links the movers together via, for example, bearings.

More particularly, according to various embodiments, disclosed herein is a robot for moving substrates within a transfer chamber and for transferring the substrates between the transfer chamber and a plurality of process chambers connected thereto. The robot can operate in both a vacuum environment and an atmospheric environment and can transfer substrates between the chambers without breaking vacuum or opening the environment.

Reference throughout this specification to, for example, "one embodiment," "certain embodiments," "one or more embodiments" or "an embodiment" means that a particular feature, structure, material, or characteristic described in connection with the embodiment is included in at least one embodiment of the invention. Thus, the appearances of the phrases such as "in one or more embodiments," "in certain embodiments," "in one embodiment" or "in an embodiment" in various places throughout this specification are not necessarily referring to the same embodiment of the invention. Furthermore, the particular features, structures, materials, or characteristics may be combined in any suitable manner in one or more embodiments.

As used herein, the singular forms "a," "an," and "the" include plural references unless the context clearly indicates otherwise. Thus, for example, reference to "a lift pin" includes a single lift pin as well as more than one lift pin.

As used herein, the term "about" in connection with a measured quantity, refers to the normal variations in that measured quantity as expected by one of ordinary skill in the art in making the measurement and exercising a level of care commensurate with the objective of measurement and the precision of the measuring equipment. In certain embodiments, the term "about" includes the recited number ±10%, such that "about 10" would include from 9 to 11.

The term "at least about" in connection with a measured quantity refers to the normal variations in the measured quantity, as expected by one of ordinary skill in the art in making the measurement and exercising a level of care commensurate with the objective of measurement and precisions of the measuring equipment and any quantities higher than that. In certain embodiments, the term "at least about" includes the recited number minus 10% and any quantity that is higher such that "at least about 10" would include 9 and anything greater than 9. This term can also be expressed as "about 10 or more." Similarly, the term "less than about" typically includes the recited number plus 10% and any quantity that is lower such that "less than about 10" would include 11 and anything less than 11. This term can also be expressed as "about 10 or less."

Unless otherwise indicated, all parts and percentages are by weight. Weight percent (wt. %), if not otherwise indicated, is based on an entire composition free of any volatiles, that is, based on dry solids content.

Figure 1B:
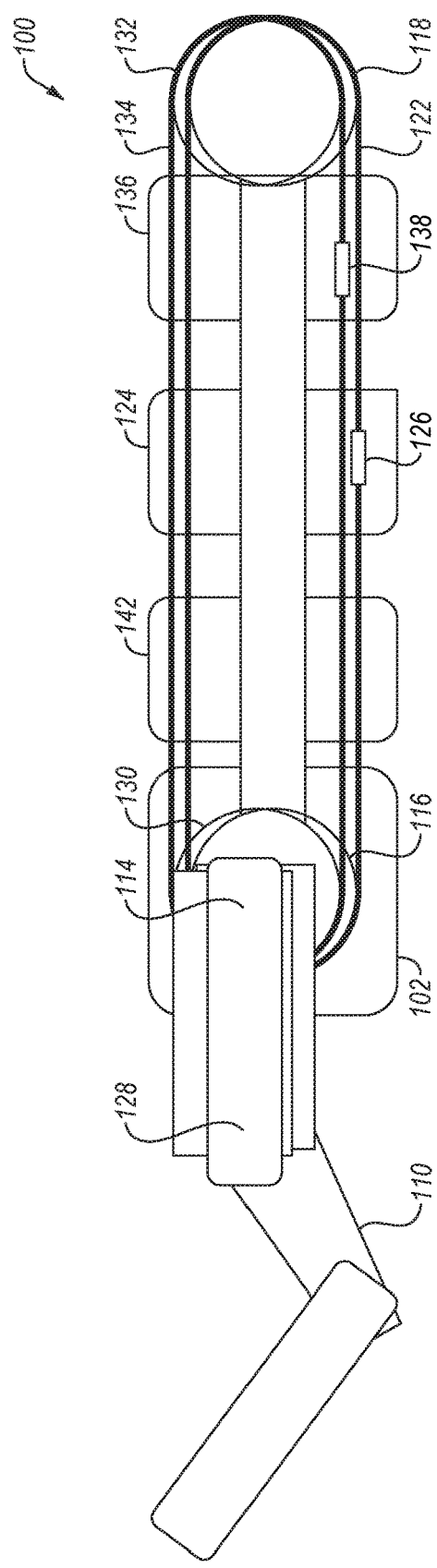
FIG. 1B is a schematic showing a top view of a robot according to embodiments described herein.

FIG. 1A is a schematic showing a side view of a robot 100 according to embodiments described herein. FIG. 1B is a schematic showing a top view of the robot 100 according to embodiments described herein. According to various embodiments, as shown in FIGS. 1A and 1B, a robot 100 can include a first (main) mover 102 configured to be driven along a base 104 of a linear motor. The base 104 can be a magnetic levitation platform of the linear motor. The linear motor can be any suitable motor known to those of ordinary skill in the art. The robot 100 can further include a support structure 108 disposed on the first mover 102. According to embodiments, the support structure 108 can be a cantilevered beam having one or more pulleys (e.g., including bearings) 116, 118, 130, 132 on both ends of the support structure 108. In addition to or instead of the cantilevered beam, a mover positioned at the opposite end of the base 104 (not shown) and configured to move in unison with the first mover can support moment loads.

According to embodiments, a first robot arm 110 can be attached to a first end 112 of the support structure 108 at a shoulder axis 114. For example, the first robot arm 110 can be attached to the first end 112 via a first pulley 116. The first robot arm 110 can be driven by a first arm drive assembly comprising the first pulley 116 and a second pulley 118 attached to a second end 120 of the support structure 108. According to embodiments, a first band 122 can be positioned on the first pulley 116 and the second pulley 118. Accordingly, horizontal movement of the first band 122 can cause the first pulley 116 to rotate about the shoulder axis 114 and can additionally cause the second pulley 118 to rotate.

According to embodiments, robot 100 can further include a second mover 124 configured to be driven by the base 104 of the linear motor. The second mover 124 can include a post 126 attached to the first band 122. Relative motion of the second mover 124 to the first mover 102 causes the first band 122 to move about the first pulley 116 and the second pulley 118. Motion of the first band 122 rotates the first pulley 116 and the second pulley 118, for example, via a corresponding first bearing and a second bearing. Rotation of the first band 122 about the first pulley 116 rotates the first robot arm 110 about the shoulder axis 114.

According to further embodiments, robot 100 can further include a second robot arm 128 attached to the support structure 108 at the shoulder axis 114. The second robot arm 128 can be attached to a third pulley 130 attached to the first end 112 of the support structure 108. In embodiments, the third pulley 130 can share an axis of rotation with the first pulley 116 and can be positioned above or below the first pulley 116. The second robot arm 128 can be driven by a second arm drive assembly comprising the third pulley 130 and a fourth pulley 132 attached to the second end 120 of the support structure 108. The fourth pulley 132 can share an axis of rotation with the second pulley 118. According to embodiments, a second band 134 may be positioned about the third pulley 130 and the fourth pulley 132, and may connect the third pulley 130 to the fourth pulley 132. According to embodiments, the first arm 110 and the first arm drive assembly can be positioned above or below the second arm 128 and the second arm drive assembly.

In various embodiments, robot 100 can further include a third mover 136 configured to be driven by the base 104 of the linear motor. The third mover 136 can include a post 138 attached to the second band 134. Relative motion of the third mover 136 to the first mover 102 causes the second band 134 move about the third pulley 130 and the fourth pulley 132. Motion of the second band 134 rotates the third pulley 130 and the fourth pulley 132, for example, via a corresponding first bearing and a second bearing. Rotation of the second band 134 about the third pulley 130 respectively rotates the second robot arm 128 about the shoulder axis 114.

According to certain embodiments, the robot 100 can further include a third robot arm (not shown) attached to the support structure 108 at the shoulder axis 114. The third robot arm 146 can be attached to the support structure 108 via a fifth pulley (not shown) attached to the first end 112 of the support structure 108. In certain embodiments, the fifth pulley can share an axis of rotation with the first pulley 116 and can be positioned above the third pulley 130. The third robot arm 146 can be driven by a third arm drive assembly comprising the fifth pulley and a sixth pulley (not shown) attached to the second end 120 of the support structure 108. The sixth pulley can share an axis of rotation with the second pulley 118. According to embodiments, a third band may be positioned about the fifth pulley and sixth pulley.

Robot 100 can further include a fourth mover (not shown) configured to be driven by the base 104 of the linear motor. The fourth mover can include a post (not shown) attached to the third band. Relative motion of the fourth mover to the first mover 102 causes the third band to move about the fifth pulley and the sixth pulley. Motion of the third band rotates the fifth pulley and the sixth pulley, for example, via corresponding bearings. Rotation of the third band about the fifth pulley respectively rotates the third robot arm 146 about the shoulder axis 114.

It should be noted that the robot 100 can include a plurality of robot arms and associated drive assemblies. For example, the robot 100 can include one, two, three, four, five and so on robot arms together with respective drive assemblies. The pulleys of each of the robot arms may share common axes as described above.

In further embodiments, the robot 100 can include a lift mechanism 140 attached to the first mover 102. The lift mechanism 140 can be in the form of a wedge lift configured to raise and lower the support structure 108 and the one or more robot arms 110, 128, etc. attached thereto. The lift mechanism 140 can be coupled to a lift mover 142 (also referred to as a z mover or a third mover in embodiments with only one robot arm) configured to be driven by the base 104 of the linear motor. The lift mover 142 can be connected to the lift mechanism 140 such that motion of the lift mover 142 relative to the first mover 102 (e.g., motion of the lift mover 142 towards or away from the first mover 102) causes the lift mechanism 140 to adjust a height (e.g., a z-direction) of the support structure 108 and the one or more robot arm 110, 128 etc. attached thereto. For example, a decrease in distance between the first mover 102 and the lift mover 142 causes the wedge lift 140 to raise the support structure 108 and the one or more robot arm 110, 128, etc. Conversely, an increase in the distance between the first mover 102 and the lift mover 142 causes the wedge lift 140 to lower the support structure 108 and the one or more robot arm 110, 128, etc.

Each of the main (or first) mover 102, second mover 124, third mover 136 and lift mover 142 may be independently driven by the base 104 of the linear motor. Each of the movers may move in unison to move the entire robot assembly linearly within the transfer chamber. Lift mover 142 may move relative to the first mover 102 to raise or lower the robot arms 110, 128, mover 124 may move relative to the first mover 102 to reposition robot arm 110, and mover 136 may move relative to first mover 102 to reposition robot arm 128. Accordingly, coordinated movement of the various movers 102, 124, 136, 142 may cause one or more of the robot arms 110, 128 to pick up one or more wafers from a first location (e.g., from a load lock), move the one or more wafers to a second location (e.g., to a process chamber), and place the one or more wafers at the second location.

In some embodiments, the various movers 102, 124, 136, 142 are aligned along a longitudinal axis of the transfer chamber (e.g., in a single row). For example, the movers 102, 124, 136, 142 may all be in a line, and may optionally all follow along a single track. In embodiments, one or more movers may not be arranged in a line and/or may be arranged in two or more rows (e.g., three rows, four rows, etc.). For example, first mover 102 may be on a first track, second mover 124 may be on a second track that is parallel to the first track, third mover 136 may be on a third track that is parallel to the first and second track, and so on. In other embodiments, a subset of movers may be on a first track, and another subset of movers may be on a second track that is parallel to the first track. If movers are not lined up (e.g., are offset from one another in a direction perpendicular to the longitudinal axis of the transfer chamber), then a greater range of motion of the movers may be possible. For example, in FIG. 1B as illustrated, second mover 124 may be limited in motion based on the distances to mover 142 and mover 136. However, if second mover 124 is not lined up with mover 142 and mover 136, then it could potentially move in front of mover 142 or behind mover 136. By positioning the movers along different rows, the robot assembly may be more compact than if the movers are all placed along a single row.

Figure 1C:
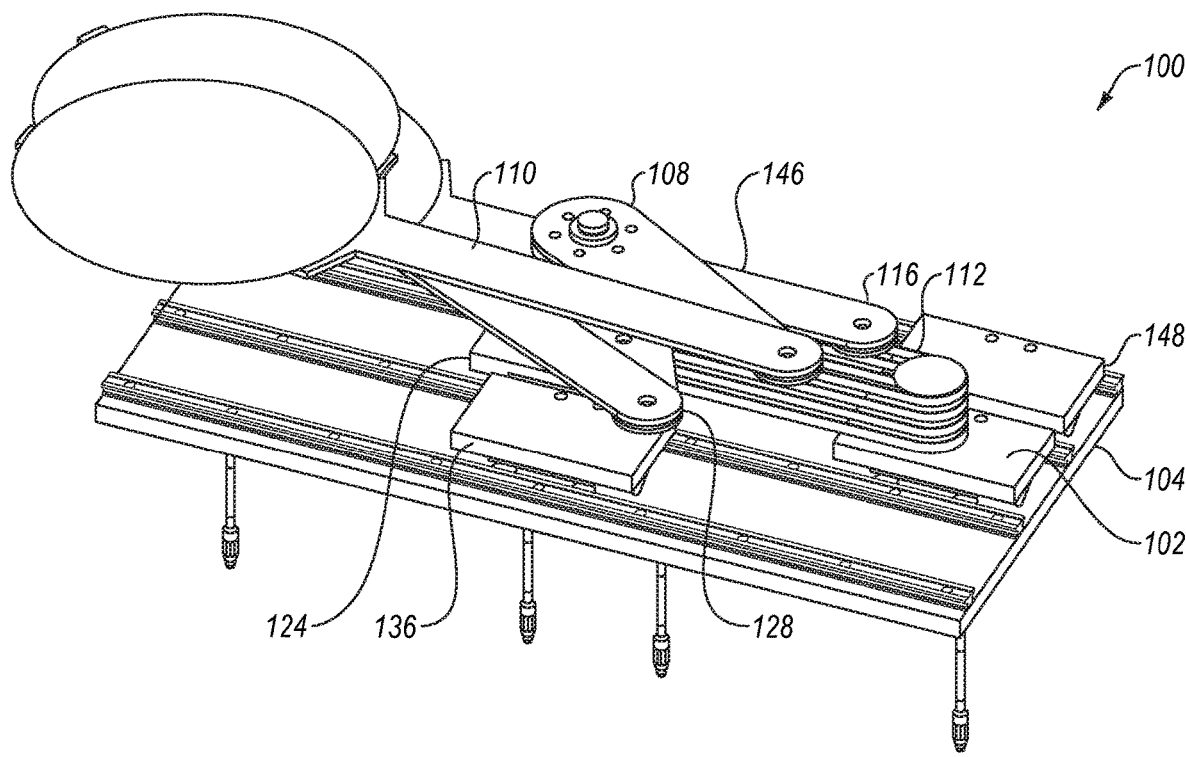
FIG. 1C depicts a perspective view of a robot with movers that are not linearly aligned along a longitudinal axis of a transfer chamber according to embodiments described herein.
Figure 1D:
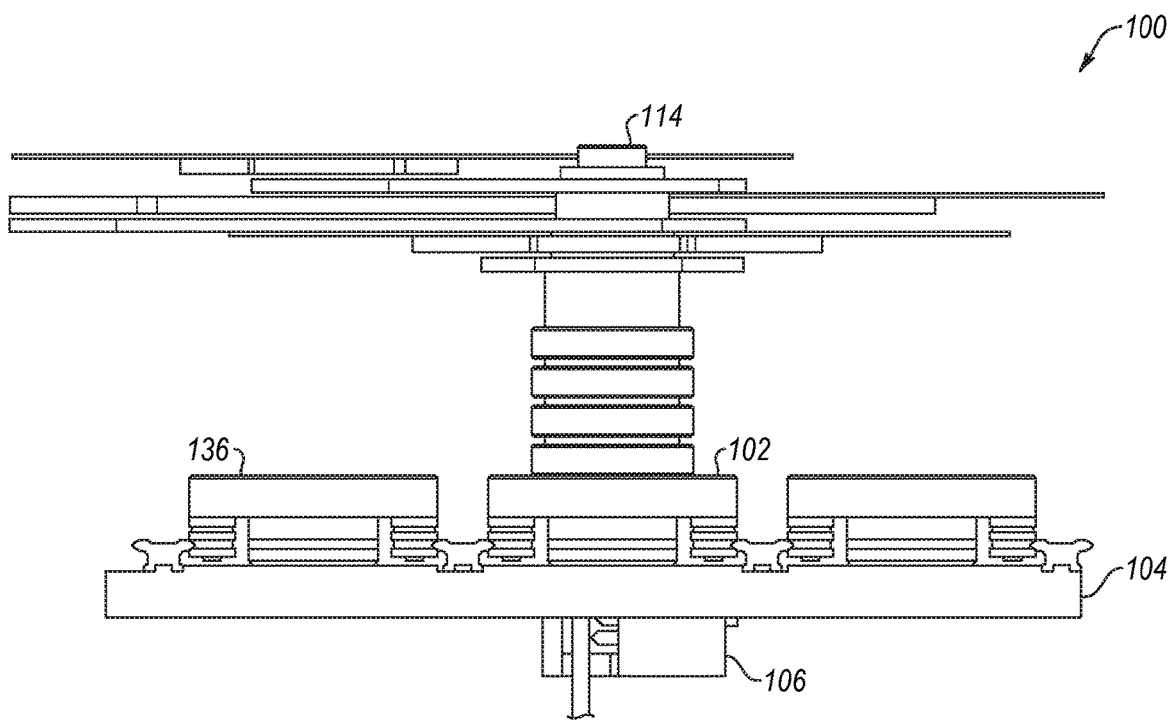
FIG. 1D depicts a side view of the robot of FIG. 1C according to embodiments described herein.

FIG. 1C depicts a perspective view of a robot with movers that are not linearly aligned along a longitudinal axis of a transfer chamber, according to embodiments described herein. FIG. 1D depicts a side view of the robot of FIG. 1C, according to embodiments described herein. FIGS. 1C-1D illustrate an embodiment in which multiple tracks are used, and in which different movers move along different tracks. Alternatively, tracks may be omitted, but movers may still be offset as shown in FIGS. 1C-1D.

Figure 2:
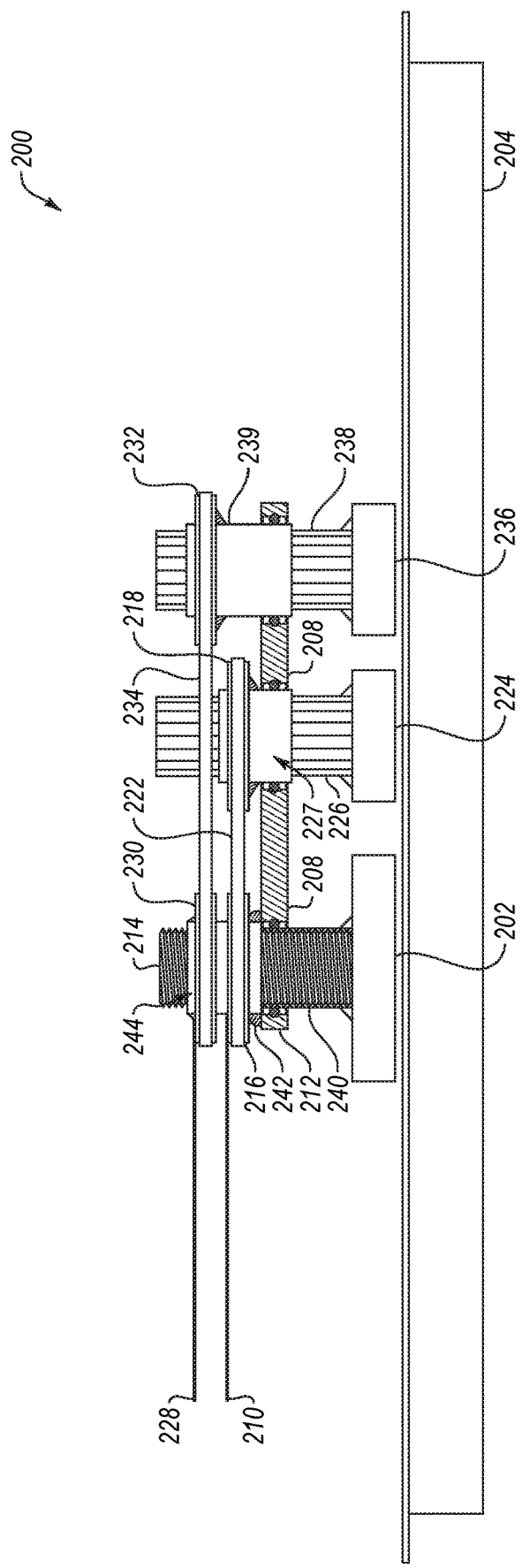
FIG. 2 is a schematic showing a side view of a robot according to embodiments described herein.

In certain embodiments, as shown in FIG. 2, a robot 200 can include a lead screw 240 as part of a lift mechanism. A first nut 242 can be threaded onto the lead screw 240 and can form a hard stop. A first pulley 216 can be positioned about the lead screw 240 and above nut 242. The first pulley 216 can be secured onto the lead screw 240 via a second nut 244. According to various embodiments, as shown in FIG. 2, the robot 200 can include a first mover 202 configured to be driven by a base 204 (e.g., a magnetic levitation platform) of a linear motor. The linear motor can be any suitable motor known to those of ordinary skill in the art. The robot 200 can further include a support structure 208 disposed on the first mover 202. According to embodiments, the support structure 208 can be a cantilevered beam having the first pulley 216 and a second pulley 218 (e.g., including bearings) on both ends of the support structure 208. The lead screw 240 can be attached to a first (main) mover 202, wherein the first pulley 216 is attached to (or rests on) the first nut 242 on the lead screw 240.

According to embodiments, as shown in FIG. 2, a first robot arm 210 can be attached to a first end 212 of the support structure 208 at a shoulder axis 214 that may be aligned with an axis of the lead screw 240. For example, the first robot arm 210 can be attached to the first end 212 via a first pulley 216. The first robot arm 210 can be driven by a first arm drive assembly comprising the first pulley 216 and a second pulley 218 attached to the support structure 208 as shown in FIG. 2. According to embodiments, the first pulley 216 and the second pulley 218 each can include a bearing about which a first band 222 is positioned as shown in FIG. 2.

According to embodiments, robot 200 can further include a second mover 224 configured to be driven by the base 204 of the linear motor. In embodiments, the support structure 208 provides a fixed separation between the first mover 202 and the second mover 224. The second mover 224 can include a post 226 (e.g., a vertical shaft) about which a nut 227 is threaded. The second pulley 218 is positioned on top of the nut 227. Rotational motion of the second mover 224 causes the second pulley 218 to rotate, which moves the first band 222, which in turn causes the first pulley 216 to rotate. Rotation of the first band 212 about the first pulley 216, and the resulting rotation of the first pulley 216, rotates the first robot arm 210 about the shoulder axis 214. According to embodiments, the post 216 is coupled to the second mover 224 such that the second pulley 218 is connected to the first vertical shaft 226, and rotation of the second mover 224 causes a) the second pulley 218 to rotate the first band 222 and the first band 222 to rotate the first pulley 216 and the first robot arm 210 about the shoulder axis 214.

According to various embodiments, the robot 200 can further include a second robot arm 228 positioned above the first robot arm 210 and on the support structure 208 at the shoulder axis 214. Robot 200 can further include a second arm drive assembly including a third pulley 230 attached to the first end of the support structure 208 and to the second robot arm 228 at the shoulder axis 214. The second arm drive assembly can further include a fourth pulley 232 attached to the second end of the support structure 208 (e.g., attached to the second end of the support structure 208). A second band 234 connects the third pulley 230 to the fourth pulley 232. A third mover 236 is configured to be driven by the base 204 of the linear motor.

According to embodiments, the third mover 236 can include a post 238 (i.e., a second vertical shaft) attached thereto about which a nut 239 is threaded. The fourth pulley 232 can be connected to post 238. Rotational motion of the third mover 236 causes the second pulley 232 to rotate, which causes the second band 234 to move about the third pulley 230 and the fourth pulley 232. Motion of the second band 234 rotates the third pulley 230, for example, via a corresponding bearing. Rotation of the second band 234 about the third pulley 230 respectively rotates the second robot arm 228 about the shoulder axis 214. Rotation of the third mover causes a) the fourth pulley to rotate the second band and b) the second band to rotate the third pulley and the second robot arm about the shoulder axis.

It should be noted that the robot 200 can include a plurality of robot arms and associated drive assemblies. For example, the robot 200 can include one, two, three, four, five and so on robot arms together with respective drive assemblies. The pulleys of each of the robot arms share common axes as described above.

The lead screw 240 forms the lift mechanism of robot 200. The lift mechanism can raise and lower the first robot arm 210 (and any other robot arms). According to embodiments, rotation of the first mover 202 in a first direction can cause the support structure 208, the first robot arm 210 (and second robot arm 228 if installed) and portions of the first arm drive assembly (and portions of the second arm drive assembly) to move upward vertically. Rotation of the first mover 202 in an opposite direction can cause the support structure 208, the first robot arm 210 (and second robot arm 228 if installed) and the portions of the first and/or second arm drive assembly to move downward vertically. The base 204 of the linear motor can cause one or more of the movers to rotate a target amount, causing the robot arms to move vertically and/or horizontally. Additionally, the base 204 can cause the movers to move linearly to move the robot assembly within a transfer chamber. The movers can rotate independently and concurrently in order to combine rotational movement and vertical movement of one or more robot arms. Additionally, the various arms can change their angles independently.

Figure 3:
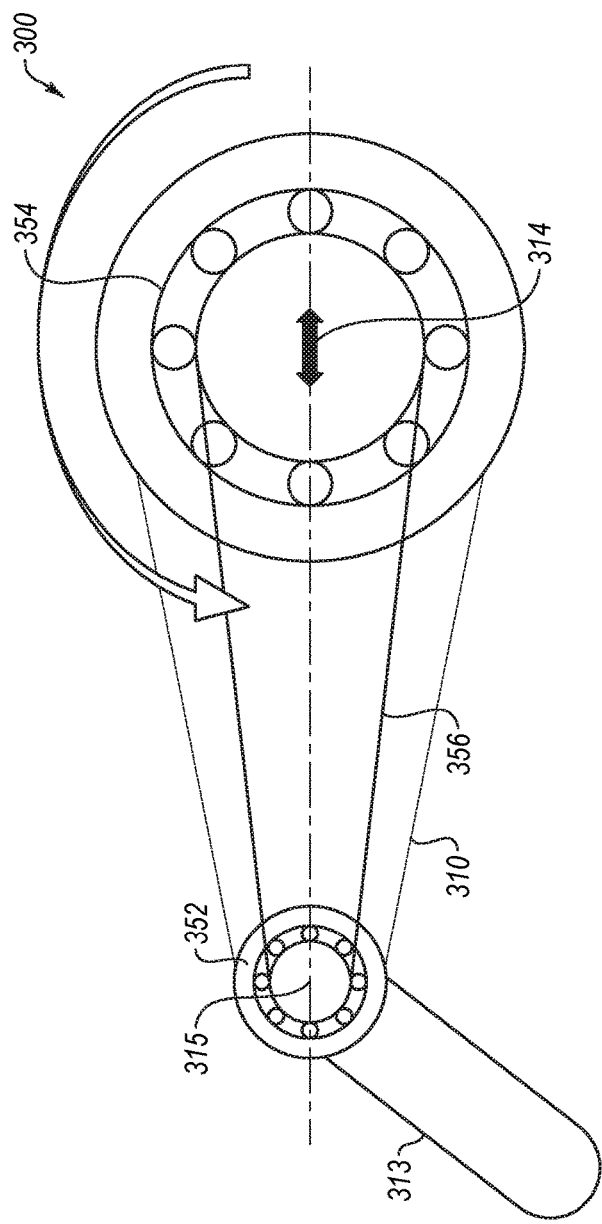
FIG. 3 is a top view showing an embodiment of a robot arm according to various embodiments.

An embodiment of a robot arm assembly 300 as described herein is shown in FIG. 3. The robot arm assembly 300 includes an arm 310 that rotates about a should axis 314 and a forearm 313 attached to arm 310 at a forearm axis 315. The arm 310 can be movable via an arm drive assembly, and the forearm 313 can be movable via a forearm drive assembly. The forearm drive assembly may include a first forearm pulley 352 attached to the forearm 313 at the forearm axis 315. The forearm drive assembly can further include a second forearm pulley 354 that can share an axis 314 with the first pulley (not shown) of the robot arm section 310. A forearm band 356 connects the first forearm pulley 352 and the second forearm pulley 354. Rotation of the arm 310 about the shoulder axis 314 causes the second forearm pulley 354 to rotate. Rotation of the second forearm pulley 354 causes the forearm band 356 to move, which in turn causes the forearm 313 to rotate about the forearm axis 315.

The first forearm pulley 352 may have a first diameter $D_w$, and the second forearm pulley 354 may have a second diameter $D_a$. There may be a predetermined ratio between the diameter of the first forearm pulley 352 and the diameter of the second forearm pulley 354. This ratio may control the amount that the forearm 313 rotates about the forearm axis 315 relative to the amount that the arm 310 rotates about the shoulder axis 314. For example, if $D_a=3*D_w$, then the forearm 313 will turn at a rate that is 3× the rate that the arm 310 turns. The robot arm assembly 300 can further include an end effector (not shown) attached to the forearm 313. The end effector can be fixed to the forearm 313 and can support a substrate (e.g., a wafer).

In some embodiments, the robot arm assembly 300 may further include a wrist (not shown) attached to the forearm at a wrist axis (not shown). The robot arm assembly may additionally include an additional pulley at the forearm axis and an additional pulley at the wrist axis, and an additional band around the two additional pulleys. There may be a predetermined diameter ratio between diameters of the two additional pulleys to control an amount of rotation of the wrist relative to the amounts of rotation of the arm and forearm.

Figure 4:
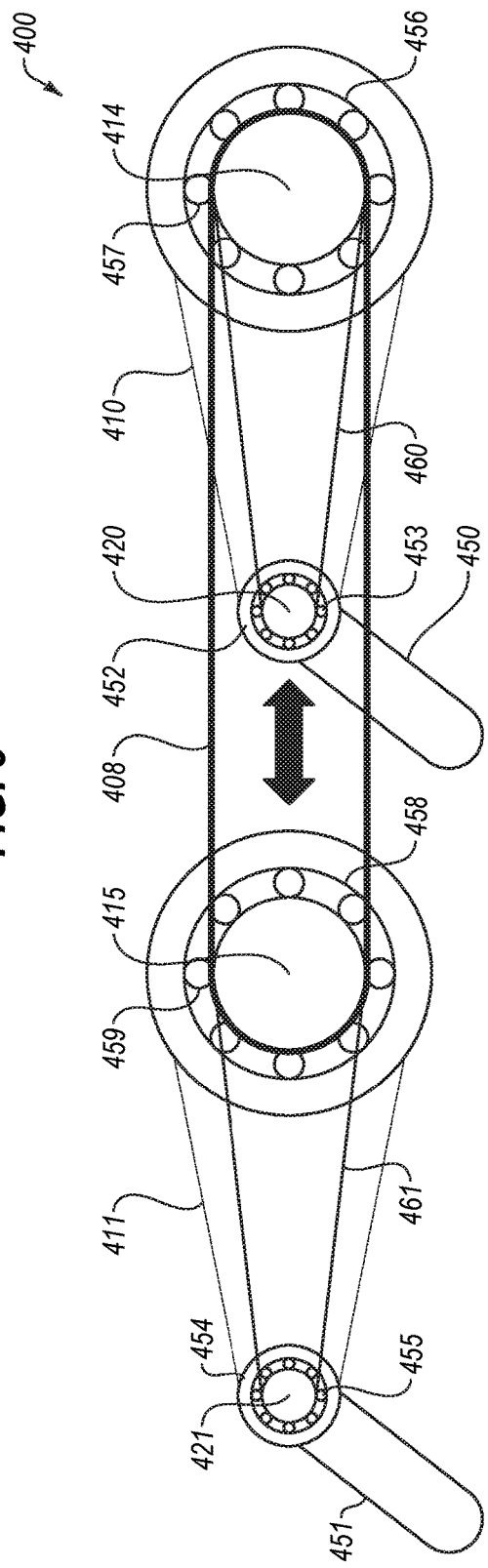
FIG. 4 is a top view showing an embodiment of a dual robot arm according to embodiments.

According to embodiments, as shown in FIG. 4, a dual robot arm assembly 400 can include two arms 410, 411, each of which rotates about a should axis 414, 415, respectively, and a forearm 450, 451 attached to each arm 410, 411, respectively, at a forearm axis 320, 321. According to embodiments, the first robot arm 410 and the second robot arm 411 can be attached to the support structure 408 via a first pulley (e.g., including a bearing) and a second pulley (e.g., including a bearing). Each arm 410, 411 can be movable via a respective arm drive assembly, and each forearm 450, 451 can be independently movable via a respectively forearm drive assembly. Each forearm drive assembly includes a first forearm pulley 452 (e.g., including bearing 453), 454 (e.g., including bearing 455) attached to the forearm 450, 451 at the forearm axis 420, 421. Each forearm drive assembly can further include a second forearm pulley 456 (e.g., including bearing 457), 458 (e.g., including bearing 459) attached to a distal end of the corresponding forearm 450, 451. Each forearm band 460, 461 connects the first forearm pulley 452, 454 and the second forearm pulley 456, 458, respectively. Rotation of each arm 410, 411 about each respective shoulder axis 414, 415 causes each forearm pulley 456, 458 to rotate. Rotation of each pulley 452, 454 causes each forearm band 460, 461 to move, which in turn causes each forearm 450, 451 to rotate about its respective forearm axis 420, 421.

Forearm pulley 456, 458 may have a first diameter $D_w$, and forearm pulley 457, 459 may have a second diameter $D_a$. There may be a predetermined ratio between the diameter of forearm pulley 456, 458 and the diameter of forearm pulley 457, 459. This ratio may control the amount that each forearm 450, 451 rotates about each forearm axis 414, 415 relative to the amount that each arm 410, 411 rotates about each shoulder axis 414, 415. For example, if $D_a=3*D_w$, then each forearm 450, 451 will turn at a rate that is 3x the rate that each arm 410, 411 turns. The dual robot arm assembly 400 can further include an end effector (not shown) attached to each forearm 450, 451. Each end effector can be fixed to each forearm 450, 451 and can support a substrate (e.g., a wafer).

The dual robot arm assembly 400 can further include a wrist (not shown) attached to each forearm 413, 414 at a wrist axis (not shown). The dual robot arm assembly 400 may additionally include another pulley at the forearm axis 320, 321, an additional pulley at each wrist axis and a corresponding band around each of these pulleys.

In the aforementioned embodiments, vertical motion of the robot arms as well as horizontal motion of the robot arms is controlled based on horizontal displacement between a first mover and one or more additional movers. In other embodiments, vertical motion of the robot arms as well as horizontal motion of the robot arms may be controlled by rotating one or more movers. These one or more movers may be maintained at fixed distances from one another in embodiments.

Figure 5:
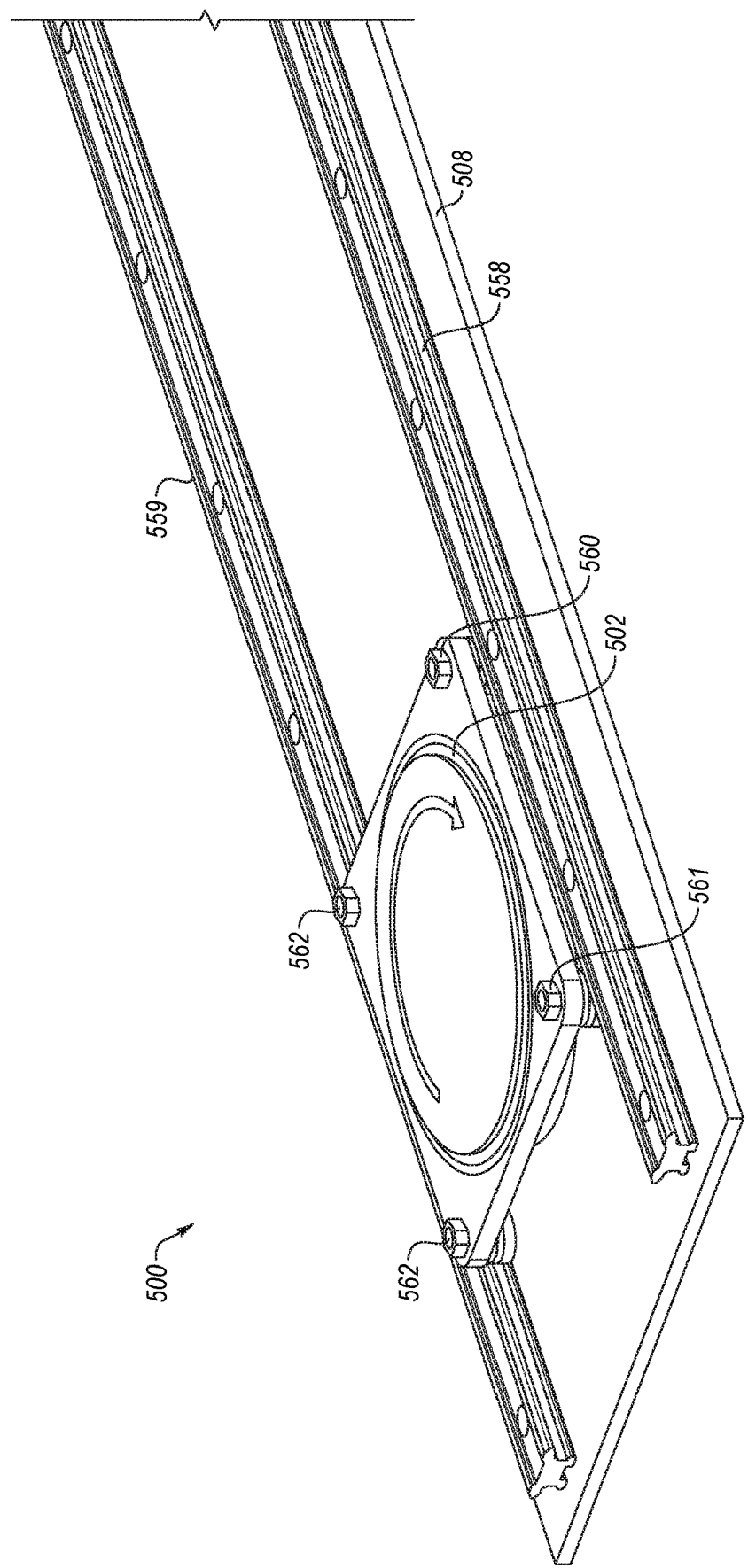
FIG. 5 is a schematic of a magnetic levitation platform and guides for a mover according to embodiments herein.

FIG. 5 is a schematic of a magnetic levitation platform and guides for a mover according to embodiments herein. According to various embodiments, a mover 502 can be configured to move along a pair of linear guides 558, 559 as shown in FIG. 5. The linear guides 558, 559 may be positioned on the vacuum side of the transfer chamber. The mover 502 can include a set of rollers 560, 561, 562, 563 that are configured to intermesh with the linear guides 558, 559, as shown in FIG. 5, and to smoothly roll along each track 558, 559 as the mover 502 travels back and forth. The mover 502 may further include a rotary bearing 580 that enables an inner portion of the mover 502 to rotate relative to an outer portion of the mover.

Figure 6:
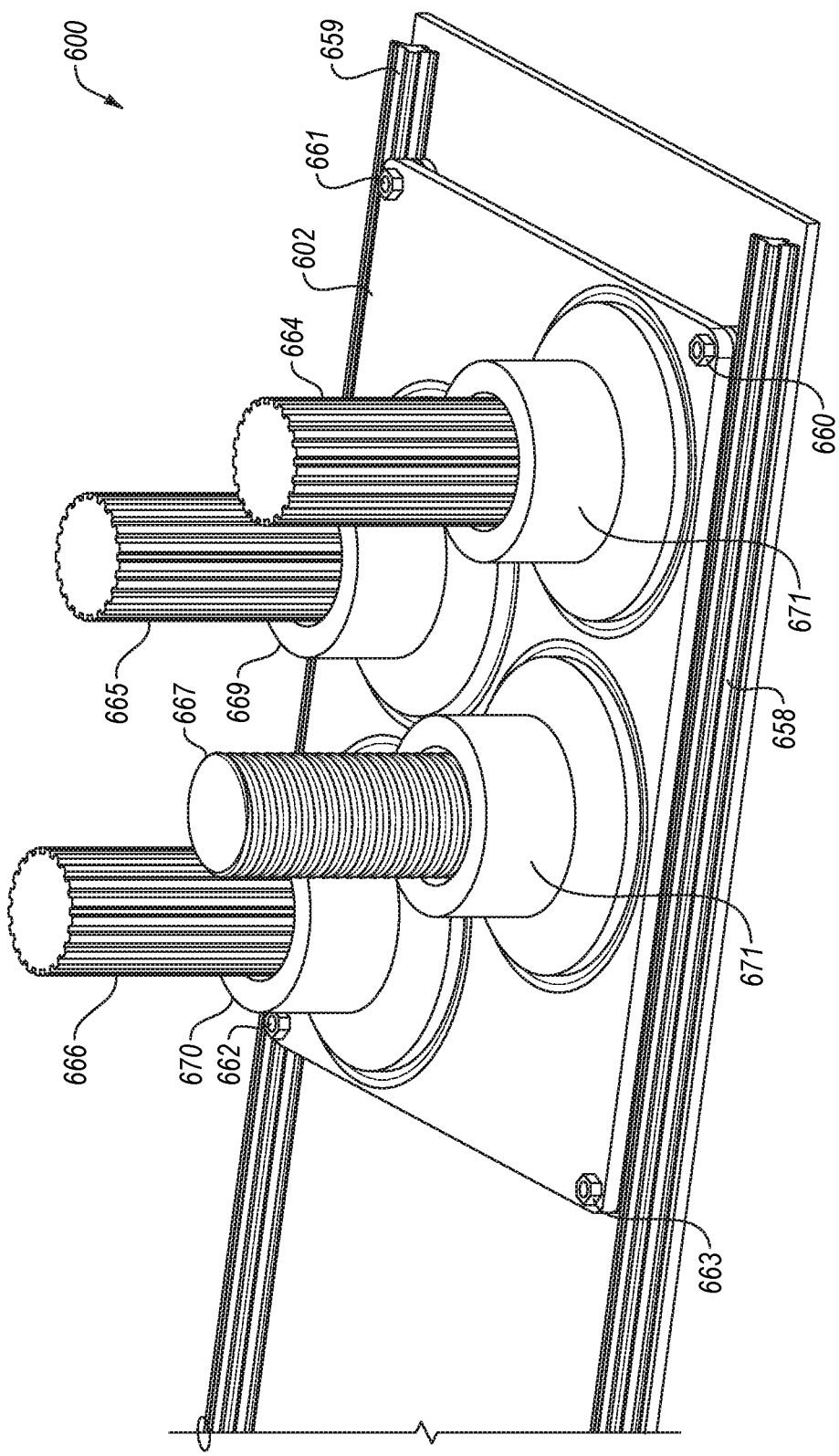
FIG. 6 is a schematic of a mover having multiple posts attached thereto according to embodiments described herein.
Figure 7:
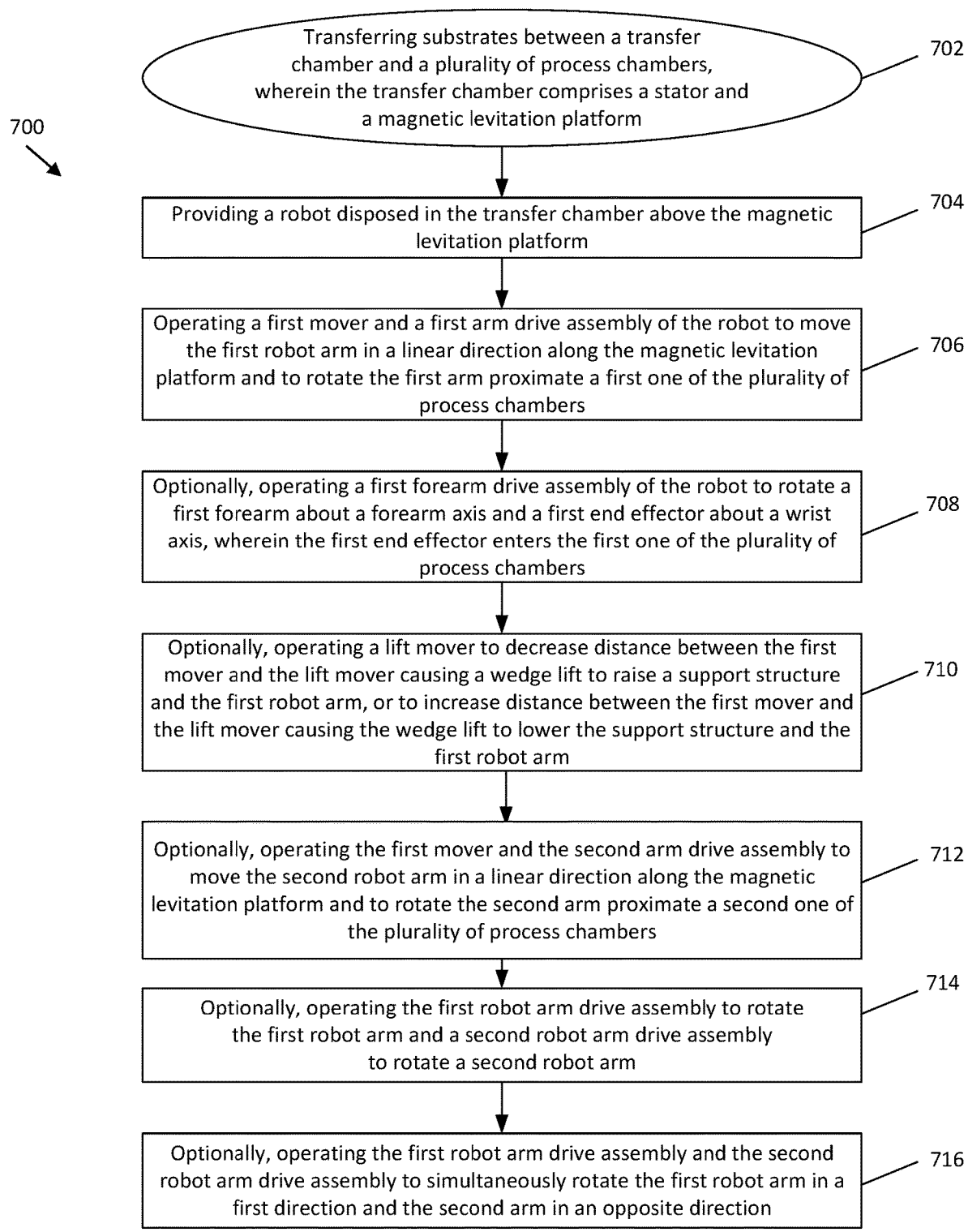
FIG. 7 illustrates a method of transferring substrates between a transfer chamber and a plurality of process chambers according to various embodiments.
Figure 8:
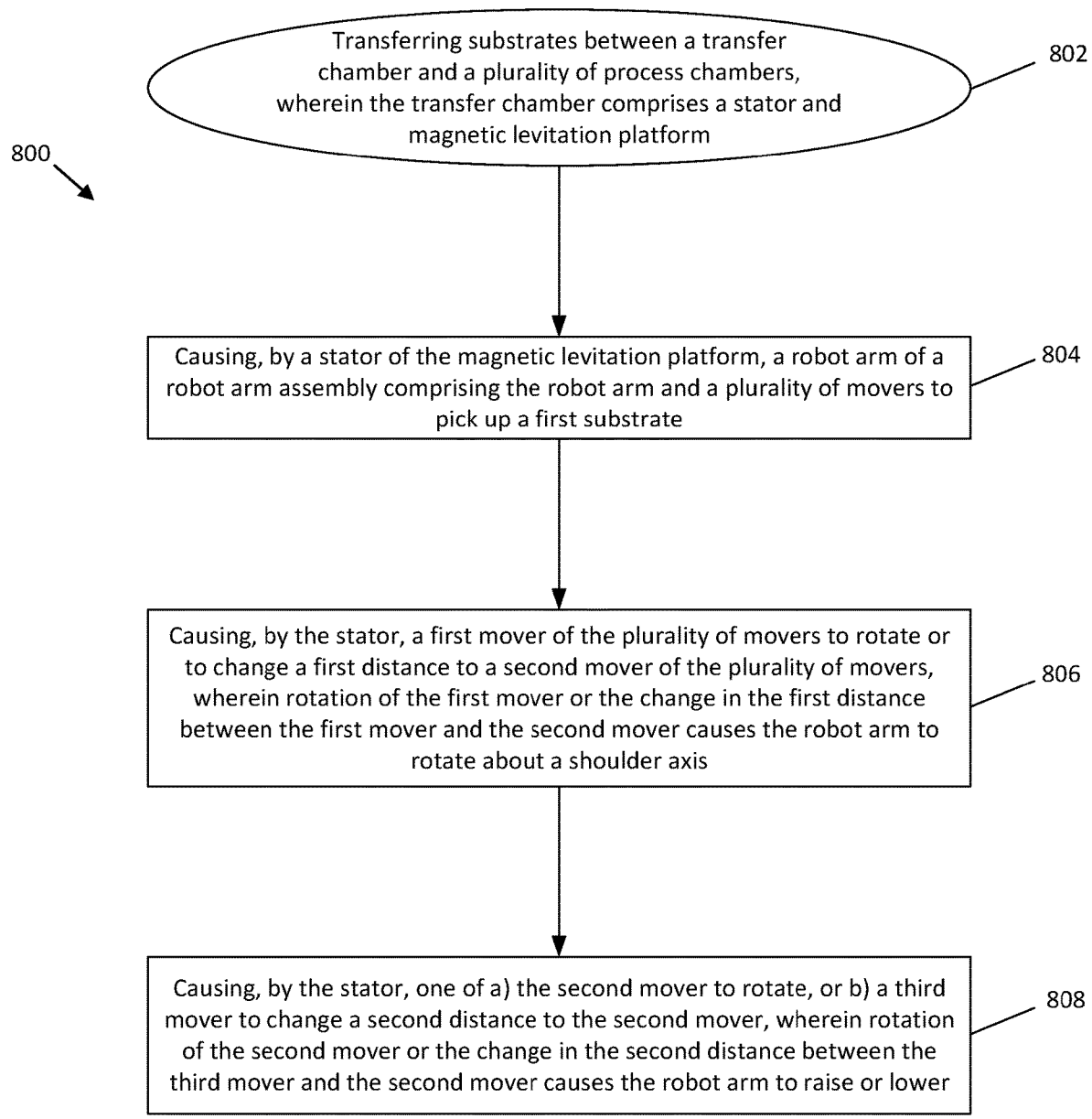
FIG. 8 illustrates a method of transferring substrates between a transfer chamber and a plurality of process chambers according to various embodiments.

FIG. 6 is a schematic of a platform 602 having multiple posts 664, 665, 666, 667 attached thereto according to embodiments described herein. In embodiments, a platform 602 can contain a plurality of posts 664, 665, 666, 667 extending upward therefrom. The platform may contain multiple movers 670, 672, 674, 676, each of which may be connected to the platform 602 via a respective rotary bearing 678, 680, 682, 684. Each of the movers 670, 672, 674, 676 may have a fixed distance from one another, but may be independently rotatable by a platform of the linear motor. The platform 602 and its attached movers can move along linear guides 658, 659 via rollers 660, 661, 662, 663. A washer, bolt or nut 668, 669, 670, 671 may be positioned around each of the plurality of posts 664, 665, 666, 667 as shown in FIG. 6. The washer, bolt or nut 668, 669, 670, 671 may rest on a bearing/platform 672, 673, 674, 675. At least one of the posts 667 can be threaded. Rotation of the mover attached to the threaded post 667 may cause one or more robot arms to move up or down vertically. Rotation of the other movers may cause associated robot arms to rotate about a shoulder axis.

Each of the robot embodiments described herein can be operable in an electronic device processing system. In embodiments, the electronic device processing system can include a transfer chamber (not shown) comprising a magnetic levitation platform (e.g., a stator) of a linear motor. A robot according to embodiments herein can be disposed in the transfer chamber above the magnetic levitation platform. The robot can contain two robot arms each configured to be driven by a robot arm drive assembly. The first (main) mover, the second mover and/or third mover are configured to move in parallel paths along the magnetic levitation base. A lift mechanism attached to the first mover can include a lift (z-motion) mover configured to be driven by the magnetic levitation base. The third mover is connected to the lift mechanism such that motion of the third mover relative to the first mover causes the lift mechanism to adjust a height of the support structure and the first robot arm (and second robot arm, if installed), within the transfer chamber.

Further disclosed herein are methods 700 for transferring substrates between a transfer chamber and a plurality of process chambers 702. The transfer chamber, to and from which substrates are transferred, comprises a magnetic levitation platform of a linear motor. At block 704, the method 700 further includes providing a robot disposed in the transfer chamber above the magnetic levitation platform. The robot can be as described herein according to various embodiments. In embodiments, the method 700 can further include at block 706 operating the first mover and the first arm drive assembly to move the first robot arm in a linear direction along the magnetic levitation platform and to rotate the first arm proximate a first one of the plurality of process chambers. The first robot arm is configured to move back and forth along the linear transfer chamber. The main mover positions the first robot arm such that the robot arm can rotate and enter one of the process chambers connected to the transfer chamber. Movement of the second mover relative to the first (main) mover causes the first robot arm to rotate.

In certain embodiments, the first robot arm can include a first forearm coupled to a first forearm drive assembly as described herein. At block 708, the method 700 optionally can include operating the first forearm drive assembly to rotate the first forearm about the forearm axis. In embodiments, a first end effector is attached to a distal end of the forearm about a wrist axis. The end effector is configured to rotate about the wrist axis and enter a first one of the plurality of process chambers.

According to embodiments, a lift mover is configured to be driven by the magnetic levitation platform of the linear motor. The lift mover can be connected to a lift mechanism as described herein above. Motion of the lift mover relative to the first mover can cause the lift mechanism to adjust a height of the support structure and the first robot arm (or additional robot arms if installed). According to embodiments, the lift mechanism can include a wedge lift. Optionally, at block 710, the method 700 can further include operating the lift mover to decrease distance between the first mover and the lift mover causing the wedge lift to raise the support structure and the first robot arm. Alternatively, the method can optionally include at block 710 operating the lift mover to increase the distance between the first mover and the lift mover causing the wedge lift to lower the support structure and the first robot arm.

The method 700 can further include at block 712, optionally, operating the first mover and the second arm drive assembly to move the second robot arm in a linear direction along the magnetic levitation platform and to rotate the second arm proximate a second one of the plurality of process chambers. Like the first robot arm, the second arm drive assembly can position the second arm by one of a plurality of process chamber such that the second robot arm can rotate and enter the process chamber. Like the first robot arm, the second robot arm can include a second forearm coupled to a second forearm drive assembly as described herein. The method 700 can include optionally operating the second forearm drive assembly to rotate the second forearm about the forearm axis. In embodiments, a second end effector is attached to a distal end of the second forearm about a second wrist axis. The second end effector can be configured to rotate about the second wrist axis and enter one of the plurality of process chambers. According to embodiments, the method 700 can include independently operating the first robot arm drive assembly to rotate the first robot arm and the second robot arm drive assembly to robot arm drive assembly.

In yet further embodiments, method 700 can include at block 714 optionally operating the first robot arm drive assembly and the second robot arm drive assembly to simultaneously rotate the first robot arm in a first direction and the second arm in an opposite direction. According to embodiments, the first robot arm can be driven to place or remove a substrate from one of the plurality of process chambers and a second robot arm can be driven to place or remove another substrate in a second one of the plurality of process chambers on an opposite side of the transfer chamber. At block 716, the first robot arm can be driven by the first robot arm drive assembly to place or remove a substrate in a process chamber while the second robot arm is simultaneously driven by the second robot arm drive assembly to place or remove another substrate in a different process chamber.

Further disclosed herein are methods 800 for transferring substrates between a transfer chamber and a plurality of process chambers 802. The transfer chamber, to and from which substrates are transferred, can include a magnetic levitation platform. The transfer chamber can be as described herein according to various embodiments. At block 804, the method 800 can include causing, by a magnetic levitation platform, a robot arm of a robot arm assembly comprising the robot arm and a plurality of movers to pick up a first substrate. The robot arm assembly can be as described herein according to various embodiments. At block 806, the method can further include causing, by the platform, a first mover of the plurality of movers to rotate or to change a first distance to a second mover of the plurality of movers. Rotation of the first mover or the change in the first distance between the first mover and the second mover can cause the robot arm to rotate about a shoulder axis. The method 800 can further include, at block 808, causing, by the platform, one of a) the second mover to rotate or b) a third mover to change a second distance to the second mover, wherein rotation of the second mover or the change in the second distance between the third mover and the second mover causes the robot arm to raise or lower.

According to embodiments, the method 800 can further include, causing, by the platform of the magnetic levitation platform, the robot arm assembly and the first substrate to move proximate a first process chamber of the plurality of process chambers. In embodiments, the method 800 can include optionally causing, by the platform, the second mover to move along the magnetic levitation platform to the first process chamber, wherein the first mover and the third mover move together with the second mover.

In embodiments, the method 800 can include optionally causing, by the platform of the magnetic levitation platform, the robot arm assembly to place the first substrate in the first process chamber. The method 800 can include optionally causing, by the platform, the first mover of the plurality of movers to rotate or to change a third distance to the second mover of the plurality of movers, wherein rotation of the first mover or the change in the third distance between the first mover and the second mover causes the robot arm to rotate about the shoulder axis and to enter the process chamber. In yet further embodiments, the method 800 can include optionally causing, by the platform, one of a) the second mover to rotate or b) the third mover to change a fourth distance to the second mover, wherein rotation of the second mover or the change in the fourth distance between the third mover and the second mover causes the robot arm to raise or lower and to place the first substrate on a support in the first process chamber.

According to embodiments, the method 800 can optionally include transferring substrates between the transfer chamber and process chambers using a second robot arm assembly. The second robot arm assembly can be as described herein according to various embodiments. In embodiments, the method can optionally include causing, by the platform of the magnetic levitation platform, the second robot arm to pick up a second substrate. In embodiments, the method 800 can include optionally causing, by the platform, a fourth mover of the plurality of movers to rotate or to change a third distance to the second mover of the plurality of movers, wherein rotation of the fourth mover or the change in the third distance between the fourth mover and the second mover causes the second robot arm to rotate about the shoulder axis. According to further embodiments, the method 800 can include optionally causing, by the platform, one of a) the second mover to rotate or b) the third mover to change the second distance to the second mover. Rotation of the third mover or the change in the second distance between the third mover and the second mover can cause the second robot arm to raise or lower.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

We claim:

1. A robot, comprising:
   a first mover configured to be driven along a platform of a linear motor;
   a support structure disposed on the first mover;
   a first robot arm attached to a first end of the support structure at a shoulder axis; and
   a first arm drive assembly comprising:
      a first pulley attached to the first end of the support structure and to the first robot arm at the shoulder axis;
      a second pulley attached to a second end of the support structure;
      a first band connecting the first pulley to the second pulley; and
      a second mover configured to be driven along the platform of the linear motor, wherein the second mover is connected to the first band, and wherein motion of the second mover relative to the first mover causes the first band to a) rotate the first pulley and the second pulley and b) rotate the first robot arm around the shoulder axis.

2. The robot of claim 1, further comprising:
   a second robot arm attached to the support structure at the shoulder axis; and
   a second arm drive assembly comprising:
      a third pulley attached to the first end of the support structure and to the second robot arm at the shoulder axis;
      a fourth pulley attached to the second end of the support structure, wherein the fourth pulley shares an axis with the second pulley;
      a second band connecting the third pulley to the fourth pulley; and
      a third mover configured to be driven along the platform of the linear motor, wherein the third mover is connected to the second band, and wherein motion of the third mover relative to the first mover causes the second band to a) rotate the third pulley and the fourth pulley and b) rotate the second robot arm around the shoulder axis.

3. The robot of claim 2, wherein the first robot arm and the first arm drive assembly are positioned above or below the second robot arm and the second arm drive assembly.

4. The robot of claim 2, further comprising:
   a third robot arm attached to the support structure at the shoulder axis; and
   a third arm drive assembly comprising:
      a fifth pulley attached to the first end of the support structure and to the third robot arm at the shoulder axis;
      a sixth pulley attached to the second end of the support structure, wherein the sixth pulley shares an axis with the second pulley;
      a third band connecting the fifth pulley to the sixth pulley; and
      a fourth mover configured to be driven along the platform of the linear motor, wherein the fourth mover is connected to the third band, and wherein motion of the fourth mover relative to the first mover causes the third band to a) rotate the fifth pulley and the sixth pulley and b) rotate the third robot arm about the shoulder axis.

5. The robot of claim 1, further comprising:
   a lift mechanism attached to the first mover; and
   a third mover configured to be driven along the platform of the linear motor, wherein the third mover is connected to the lift mechanism such that motion of the third mover relative to the first mover causes the lift mechanism to adjust a height of the support structure and the first robot arm.

6. The robot of claim 5, wherein the lift mechanism comprises a wedge lift, wherein a decrease in a distance between the first mover and the third mover causes the wedge lift to raise the support structure and the first robot arm, and wherein an increase in the distance between the first mover and the third mover causes the wedge lift to lower the support structure and the first robot arm.

7. The robot of claim 5, wherein the lift mechanism comprises a lead screw, the robot further comprising:
a nut attached to the lead screw;
a third pulley attached to the support structure;
a second band attaching the third pulley to the nut;
wherein the third mover is attached to the second band, and wherein motion of the third mover relative to the first mover causes a) the nut to rotate about the lead screw and b) the support structure and the first robot arm to move vertically.

8. The robot of claim 1, wherein the first robot arm comprises a first end effector at a distal end of the first robot arm.

9. The robot of claim 1, further comprising:
a first forearm attached to a distal end of the first robot arm at a forearm axis;
a first forearm drive assembly comprising:
  a first forearm pulley attached to the first forearm at the forearm axis;
  a second forearm pulley attached to a distal end of the first forearm; and
  a first forearm band connecting the first forearm pulley to the second forearm pulley,
wherein the rotation of the first pulley and the second pulley causes the second band to a) rotate the first forearm pulley and the second forearm pulley and b) rotate the first forearm around the forearm axis.

10. A robot, comprising:
a first mover configured to be driven along a platform of a linear motor;
a support structure disposed on the first mover;
a first robot arm positioned above the first mover and on the support structure at a shoulder axis; and
a first arm drive assembly comprising:
  a first pulley disposed at a first end of the support structure and attached to the first robot arm at the shoulder axis;
  a second pulley disposed at a second end of the support structure;
  a first band connecting the first pulley to the second pulley;
  a second mover configured to be driven along the platform of the linear motor; and
  a first vertical shaft coupled to the second mover, wherein the second pulley is connected to the first vertical shaft, and wherein rotation of the second mover causes a) the second pulley to rotate the first band and b) the first band to rotate the first pulley and the first robot arm about the shoulder axis.

11. The robot of claim 10, wherein the support structure provides a fixed separation between the first mover and the second mover.

12. The robot of claim 10, further comprising a lead screw attached to the first mover, wherein the first pulley is attached to a nut on the lead screw, and wherein rotation of the first mover causes the support structure, the first robot arm and the first arm drive assembly to move vertically.

13. The robot of claim 10, further comprising:
a second robot arm positioned above the first robot arm and on the support structure at the shoulder axis; and
a second arm drive assembly comprising:
  a third pulley attached to the first end of the support structure and to the second robot arm at the shoulder axis;
  a fourth pulley attached to the second end of the support structure, wherein the fourth pulley shares an axis with the second pulley;
  a second band connecting the third pulley to the fourth pulley;
  a third mover configured to be driven by the platform of the linear motor; and
  a second vertical shaft coupled to the third mover, wherein the fourth pulley is connected to the second vertical shaft, and wherein rotation of the third mover causes a) the fourth pulley to rotate the second band and b) the second band to rotate the third pulley and the second robot arm about the shoulder axis.

14. An electronic device processing system, comprising:
a transfer chamber comprising a magnetic levitation platform; and
a robot disposed in the transfer chamber above the magnetic levitation platform, the robot comprising:
  a first mover configured to be driven by the magnetic levitation platform;
  a support structure disposed on the first mover;
  a first robot arm attached to a first end of the support structure at a shoulder axis; and
  a first arm drive assembly comprising:
    a first pulley attached to the first end of the support structure and to the first robot arm at the shoulder axis;
    a second pulley attached to a second end of the support structure;
    a first band connecting the first pulley to the second pulley; and
    a second mover configured to be driven by the magnetic levitation platform, wherein the second mover is connected to the first band, and wherein motion of the second mover relative to the first mover causes the first band to a) rotate the first pulley and the second pulley and b) rotate the first robot arm around the shoulder axis.

15. The system of claim 14, wherein the robot further comprises:
a second robot arm attached to the support structure at the shoulder axis; and
a second arm drive assembly comprising:
  a third pulley attached to the first end of the support structure and to the second robot arm at the shoulder axis;
  a fourth pulley attached to the second end of the support structure, wherein the fourth pulley shares an axis with the second pulley;
  a second band connecting the third pulley to the fourth pulley; and
  a third mover configured to be driven by the magnetic levitation platform, wherein the third mover is connected to the second band, and wherein motion of the third mover relative to the first mover causes the second band to a) rotate the third pulley and the fourth pulley and b) rotate the second robot arm around the shoulder axis.

16. The system of claim 14, wherein the robot further comprises:
a lift mechanism attached to the first mover; and
a third mover configured to be driven by the magnetic levitation platform, wherein the third mover is connected to the lift mechanism such that motion of the third mover relative to the first mover causes the lift mechanism to adjust a height of the support structure and the first robot arm.

* * * * *